US010968985B2

(12) United States Patent
Fliearman et al.

(10) Patent No.: US 10,968,985 B2
(45) Date of Patent: Apr. 6, 2021

(54) BI-DIRECTIONAL INTEGRATED STARTER-GENERATOR DEVICE

(71) Applicant: Deere & Company, Moline, IL (US)

(72) Inventors: Steven R. Fliearman, Coffeyville, KS (US); Douglas S. Base, Coffeyville, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 61 days.

(21) Appl. No.: 16/385,784

(22) Filed: Apr. 16, 2019

(65) Prior Publication Data

US 2020/0332864 A1 Oct. 22, 2020

(51) Int. Cl.
*H02K 51/00* (2006.01)
*F16H 3/72* (2006.01)
(Continued)

(52) U.S. Cl.
CPC ............. *F16H 3/725* (2013.01); *F02N 11/04* (2013.01); *F16H 3/006* (2013.01); *H02K 51/00* (2013.01);
(Continued)

(58) Field of Classification Search
CPC .......... F16H 3/006; F16H 3/725; F02N 11/04; F02N 2011/0896; H02K 51/00; F02D 2250/24
(Continued)

(56) References Cited

U.S. PATENT DOCUMENTS 3,062,073 A 11/1962 Brass
3,081,759 A 3/1963 Mauck et al.
(Continued)

FOREIGN PATENT DOCUMENTS

DE 69218975 T2 6/1994
DE 19745995 A1 9/1998
(Continued)

OTHER PUBLICATIONS

USPTO Non-Final Office Action dated Jun. 19, 2020 for Utility U.S. Appl. No. 16/386,075.
(Continued)

*Primary Examiner* — Leslie A Nicholson, III
(74) *Attorney, Agent, or Firm* — Klintworth & Rozenblat IP LLP

(57) ABSTRACT

A combination starter-generator device for a work vehicle includes an electric machine and a bi-directional gear set. The gear set is configured to receive rotational input from the electric machine and from the engine and to couple the electric machine and the engine in a first power flow direction and a second power flow direction. In the first power flow direction the gear set effects a first gear ratio, and in the second power flow direction the gear set effects a second gear ratio. In the first power flow direction, the gear set receives input power from the electric machine in a first clock direction and outputs power to the engine in a second clock direction opposite the first clock direction. In the second power flow direction, input power from the engine is in the second clock direction and output power to the electric machine is in the second clock direction.

11 Claims, 7 Drawing Sheets

(51) Int. Cl.
*F16H 3/00* (2006.01)
*F02N 11/04* (2006.01)
*F02N 11/08* (2006.01)

(52) U.S. Cl.
CPC .................. *F02D 2250/24* (2013.01); *F02N 2011/0896* (2013.01)

(58) Field of Classification Search
USPC ............................................................ 475/5
See application file for complete search history.

(56) References Cited

U.S. PATENT DOCUMENTS

| | | |
|---|---|---|
| 3,150,544 A | 9/1964 | Brass |
| 3,640,152 A | 2/1972 | Shirai et al. |
| 3,675,511 A | 7/1972 | Wakamatsu et al. |
| 3,942,024 A | 3/1976 | Ingham |
| 4,122,354 A | 10/1978 | Howland |
| 4,213,299 A | 7/1980 | Sharar |
| 4,473,752 A | 9/1984 | Cronin |
| 4,484,495 A | 11/1984 | Mason |
| 4,631,455 A | 12/1986 | Taishoff |
| 4,708,030 A | 11/1987 | Cordner |
| 4,750,384 A | 6/1988 | Belliveau |
| 4,862,009 A | 8/1989 | King |
| 4,926,713 A | 5/1990 | Madill |
| 5,033,994 A | 7/1991 | Wu |
| 5,177,968 A | 1/1993 | Fellows |
| 5,418,400 A | 5/1995 | Stockton |
| 5,558,173 A | 9/1996 | Sherman |
| 5,856,709 A | 1/1999 | Ibaraki et al. |
| 6,371,877 B1 | 4/2002 | Schroeder et al. |
| 6,378,479 B1 | 4/2002 | Nishidate et al. |
| RE37,743 E | 6/2002 | Yang |
| 6,409,622 B1 | 6/2002 | Bolz et al. |
| 6,484,596 B2 | 11/2002 | Puchas |
| 6,569,054 B2 | 5/2003 | Kato |
| 6,582,333 B2 | 6/2003 | Man |
| 6,661,109 B2 | 12/2003 | Fukasaku et al. |
| 6,746,354 B1 * | 6/2004 | Ziemer .................. B60K 6/365 475/149 |
| 6,770,005 B2 | 8/2004 | Aikawa et al. |
| 6,832,970 B2 | 12/2004 | Eibler |
| 6,852,063 B2 | 2/2005 | Takahashi et al. |
| 6,910,453 B2 | 6/2005 | Sugino et al. |
| 6,965,173 B2 | 11/2005 | Fukasaku et al. |
| 7,028,794 B2 | 4/2006 | Odahara et al. |
| 7,044,255 B2 | 5/2006 | Maeda et al. |
| 7,086,978 B2 | 8/2006 | Aikawa et al. |
| 7,117,965 B2 | 10/2006 | Yatabe et al. |
| 7,223,191 B2 | 5/2007 | Aikawa et al. |
| 7,374,031 B2 | 5/2008 | Skorucak |
| 7,387,043 B2 | 6/2008 | Sakamoto et al. |
| 7,503,871 B2 | 3/2009 | Kozarekar et al. |
| 7,582,033 B2 | 9/2009 | Kefti-Cherif et al. |
| 7,753,147 B2 | 7/2010 | Usoro |
| 7,780,562 B2 | 8/2010 | King et al. |
| 8,143,735 B2 | 3/2012 | Bauer |
| 8,226,517 B2 | 7/2012 | Tsai et al. |
| 8,235,859 B2 | 8/2012 | Yun |
| 8,480,529 B2 | 7/2013 | Pohl et al. |
| 8,500,601 B2 | 8/2013 | Arnold et al. |
| 8,584,359 B1 | 11/2013 | Bowman |
| 8,727,944 B2 | 5/2014 | Noboru et al. |
| 8,734,281 B2 | 5/2014 | Ai et al. |
| 8,996,227 B2 | 3/2015 | Sisk et al. |
| 9,017,207 B2 | 4/2015 | Pohl et al. |
| 9,074,656 B2 | 7/2015 | Benz et al. |
| 9,145,136 B2 | 9/2015 | Suntharalingam et al. |
| 9,184,646 B2 | 11/2015 | Fulton |
| 9,261,064 B2 | 2/2016 | Patel et al. |
| 9,371,810 B2 | 6/2016 | Creviston |
| 9,421,855 B2 | 8/2016 | Suntharalingam et al. |
| 9,541,172 B1 | 1/2017 | Wright |
| 9,555,795 B2 | 1/2017 | Nefcy et al. |
| 9,676,265 B2 | 6/2017 | Choi |
| 9,726,282 B2 | 8/2017 | Pohl et al. |
| 10,183,569 B2 | 1/2019 | Toyota et al. |
| 10,479,187 B2 | 11/2019 | Lubben et al. |
| 10,518,626 B2 | 12/2019 | Pettersson |
| 10,591,025 B2 | 3/2020 | Fliearman et al. |
| 10,619,711 B2 | 4/2020 | Fliearman et al. |
| 2001/0019210 A1 | 9/2001 | Fukasaku et al. |
| 2001/0025621 A1 | 10/2001 | Shiraishi et al. |
| 2001/0042649 A1 | 11/2001 | Maeda et al. |
| 2002/0019284 A1 | 2/2002 | Aikawa et al. |
| 2002/0033059 A1 | 3/2002 | Pels et al. |
| 2002/0117860 A1 | 8/2002 | Man et al. |
| 2002/0139592 A1 | 10/2002 | Fukasaku et al. |
| 2002/0177504 A1 | 11/2002 | Pels et al. |
| 2003/0001391 A1 | 1/2003 | Kuang et al. |
| 2003/0104900 A1 | 6/2003 | Takahashi |
| 2003/0224888 A1 | 12/2003 | Wilder et al. |
| 2004/0055800 A1 | 3/2004 | Katou et al. |
| 2004/0116226 A1 | 6/2004 | Baker et al. |
| 2006/0111211 A1 | 5/2006 | Kefti-Cherif et al. |
| 2006/0166777 A1 | 7/2006 | Aikawa et al. |
| 2007/0108006 A1 | 5/2007 | Schmid et al. |
| 2007/0157899 A1 | 7/2007 | Seufert et al. |
| 2007/0265126 A1 | 11/2007 | Janson et al. |
| 2008/0179119 A1 | 7/2008 | Grenn et al. |
| 2008/0314195 A1 | 12/2008 | Andoh et al. |
| 2009/0055061 A1 | 2/2009 | Zhu |
| 2009/0176611 A1 | 7/2009 | Avery |
| 2009/0264241 A1 | 10/2009 | Dittrich et al. |
| 2009/0312145 A1 | 12/2009 | Pohl et al. |
| 2010/0029428 A1 | 2/2010 | Abe et al. |
| 2010/0044183 A1 | 2/2010 | Guagolz et al. |
| 2010/0048338 A1 | 2/2010 | Si |
| 2010/0063704 A1 | 3/2010 | Okubo et al. |
| 2010/0076634 A1 | 3/2010 | Brigham |
| 2011/0010031 A1 | 1/2011 | Syed et al. |
| 2011/0015020 A1 | 1/2011 | Grosser |
| 2011/0053729 A1 | 3/2011 | Parsons et al. |
| 2011/0070999 A1 | 3/2011 | Soliman et al. |
| 2011/0263379 A1 | 10/2011 | Liang et al. |
| 2012/0103293 A1 | 5/2012 | Robinette et al. |
| 2012/0235473 A1 | 9/2012 | Jiang et al. |
| 2012/0240723 A1 | 9/2012 | Gluckler et al. |
| 2013/0046427 A1 | 2/2013 | Hohenberg |
| 2013/0252773 A1 | 9/2013 | Suntharalingam et al. |
| 2013/0316873 A1 | 11/2013 | Jansen et al. |
| 2014/0011619 A1 | 1/2014 | Pohl et al. |
| 2014/0137824 A1 | 5/2014 | Jacques et al. |
| 2014/0150604 A1 | 6/2014 | Kaltenbach |
| 2014/0256490 A1 | 9/2014 | Honda |
| 2015/0226323 A1 | 8/2015 | Pohl et al. |
| 2015/0239335 A1 | 8/2015 | Wachter et al. |
| 2016/0031438 A1 | 2/2016 | Matsui et al. |
| 2016/0031439 A1 | 2/2016 | Nefcy et al. |
| 2016/0052382 A1 | 2/2016 | Clark et al. |
| 2016/0076629 A1 | 3/2016 | Modrzejewski et al. |
| 2016/0082821 A1 | 3/2016 | Mueller et al. |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0248196 A1 | 8/2017 | Turner et al. |
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176806 A1 | 6/2019 | Trent |

(56) References Cited

U.S. PATENT DOCUMENTS

| | | | |
|---|---|---|---|
| 2019/0219022 A1 | 7/2019 | Palil et al. | |
| 2019/0344655 A1 | 11/2019 | Pettersson | |
| 2019/0351751 A1 | 11/2019 | Sato et al. | |

FOREIGN PATENT DOCUMENTS

| | | | |
|---|---|---|---|
| DE | 19927521 A1 | 6/2000 | |
| DE | 19911924 A1 | 9/2000 | |
| DE | 19923316 A1 | 11/2000 | |
| DE | 10003741 A1 | 4/2001 | |
| DE | 010007959 A1 | 8/2001 | |
| DE | 102006037576 A1 | 4/2008 | |
| DE | 102010030570 A1 | 12/2011 | |
| DE | 102010030571 A1 | 12/2011 | |
| DE | 102010060140 A1 | 4/2012 | |
| DE | 102011080068 A1 | 1/2013 | |
| DE | 102011089708 A1 | 6/2013 | |
| DE | 102011089709 A1 | 6/2013 | |
| DE | 102011089710 A1 | 6/2013 | |
| DE | 112011103973 T5 | 10/2013 | |
| DE | 102008045202 B4 | 3/2014 | |
| DE | 102013203009 A1 | 8/2014 | |
| DE | 102013012747 A1 | 9/2014 | |
| DE | 102013206970 A1 | 10/2014 | |
| DE | 102014200720 A1 | 2/2015 | |
| DE | 102014200723 B3 | 2/2015 | |
| DE | 102013219948 | 4/2015 | |
| DE | 102017203026 A1 | 8/2017 | |
| DE | 102017204269 A1 | 9/2017 | |
| EP | 0645271 B1 | 3/1995 | |
| EP | 1069310 A2 | 1/2001 | |
| EP | 2272702 A2 | 1/2011 | |
| EP | 2664785 | 11/2013 | |
| GB | 0650564 | 2/1951 | |
| JP | 2015116004 A | 6/2015 | |
| WO | 0188369 A1 | 11/2001 | |
| WO | 200700107458 A2 | 9/2007 | |

OTHER PUBLICATIONS

USPTO Non-Final Office Action dated Mar. 4, 2020 for Utility U.S. Appl. No. 16/385,934.

German Search Report for application No. 1020182214956 dated May 28, 2019.

German Search Report for application No. 1020172030267 dated Aug. 4, 2017.

Deere & Company, Multi-Mode Integrated Starter-Generator Device, Utility U.S. Appl. No. 16/385,860, filed Apr. 16, 2019.

Deere & Company, Multi-Mode Integrated Starter-Generator Device With Preloaded Clutch, Utility U.S. Appl. No. 16/385,892, filed Apr. 16, 2019.

Deere & Company, Multi-Mode Integrated Starter-Generator Device With Magnetic Cam Assembly, Utility U.S. Appl. No. 16/385,934, filed Apr. 16, 2019.

Deere & Company, Multi-Mode Integrated Starter-Generator Device With Cam Arrangement, Utility U.S. Appl. No. 16/385,964, filed Apr. 16, 2019.

Deere & Company, Multi-Mode Integrated Starter-Generator Device With Dog Clutch Arrangement, Utility U.S. Appl. No. 16/385,989, filed Apr. 16, 2019.

Deere & Company, Multi-Mode Starter-Generator Device Transmission With Single Valve Control, Utility U.S. Appl. No. 16/386,001, filed Apr. 16, 2019.

Deere & Company, Multi-Mode Integrated Starter-Generator Device With Electromagnetic Actuation Assembly, Utility U.S. Appl. No. 16/386,020, filed Apr. 16, 2019.

Deere & Company, Multi-Mode Integrated Starter-Generator Device With Transmission Assembly Mounting Arrangement, Utility U.S. Appl. No. 16/386,052, filed Apr. 16, 2019.

Deere & Company, Multi-Mode Integrated Starter-Generator Device With Solenoid Cam Actuation Apparatus, Utility U.S. Appl. No. 16/386,075, filed Apr. 16, 2019.

USPTO Non-Final Office Action dated Sep. 9, 2019 for Utility U.S. Appl. No. 15/834,356.

USPTO Non-Final Office Action dated Feb. 25, 2019 for Utility U.S. Appl. No. 15/834,356.

USPTO Non-Final Office Action dated Nov. 1, 2018 for Utility U.S. Appl. No. 15/825,520.

USPTO Non-Final Office Action dated Nov. 2, 2017 for Utility U.S. Appl. No. 15/056,767.

USPTO Final Office Action dated Mar. 8, 2019 for Utility U.S. Appl. No. 15/056,767.

USPTO Final Office Action dated Jun. 11, 2018 for Utility U.S. Appl. No. 15/056,767.

USPTO Non-Final Office Action dated Sep. 28, 2018 for Utility U.S. Appl. No. 15/056,767.

German Search Report for application No. 1020182189080 dated May 27, 2019.

German Search Report for application No. 1020182180784 dated Jun. 4, 2019.

German Search Report issued in German Application No. 102020204646.8 dated Sep. 1, 2020. (6 pages).

German Search Report issued in German Application No. 102020204943.3 dated Sep. 4, 2020. (7 pages).

German Search Report issued in German Application No. 102020204704.9 dated Sep. 3, 2020. (7 pages).

German Search Report issued in German Application No. 102020203063.4 dated Sep. 4, 2020. (6 pages).

German Search Report issued in German Application No. 102020204642.5 dated Sep. 4, 2020. (8 pages).

German Search Report issued in German Application No. 102020204706.5 dated Sep. 3, 2020. (7 pages).

German Search Report issued in German Application No. 102020204795.2 dated Sep. 2, 2020. (7 pages).

German Search Report issued in German Application No. 102020204705.7 dated Sep. 1, 2020. (6 pages).

USPTO Non-Final Office Action dated Aug. 24, 2020 for Utility U.S. Appl. No. 16/385,964.

USPTO non-final office action issued in pending Utility U.S. Appl. No. 16/386,052 dated Oct. 30, 2020.

Harmonic Drive LLC, Harmonic Planetary Precision Gearing & Motion Control, Product Brochure, Mar. 2006.

NTN Automotive Sales Headquarters, Compact Clutch Integrated Pulley for Alternators, NTN Technical Review No. 75, 2007.

North Atalantic Starter, Starter Drives Explained, Northatlan.com, 2005.

Deere & Company, Utility U.S. Appl. No. 15/825,520, filed Nov. 29, 2017.

Ioan-Adrian Viorel et al., Integrated Starter-Generators for Automotive Applications, Technical University of Cluj-Romania, Dept. of Electrical Machines, vol. 45, No. 3, 2004.

USPTO non-final office action issued in pending U.S. Appl. No. 16/385,860 dated Nov. 4, 2020.

* cited by examiner

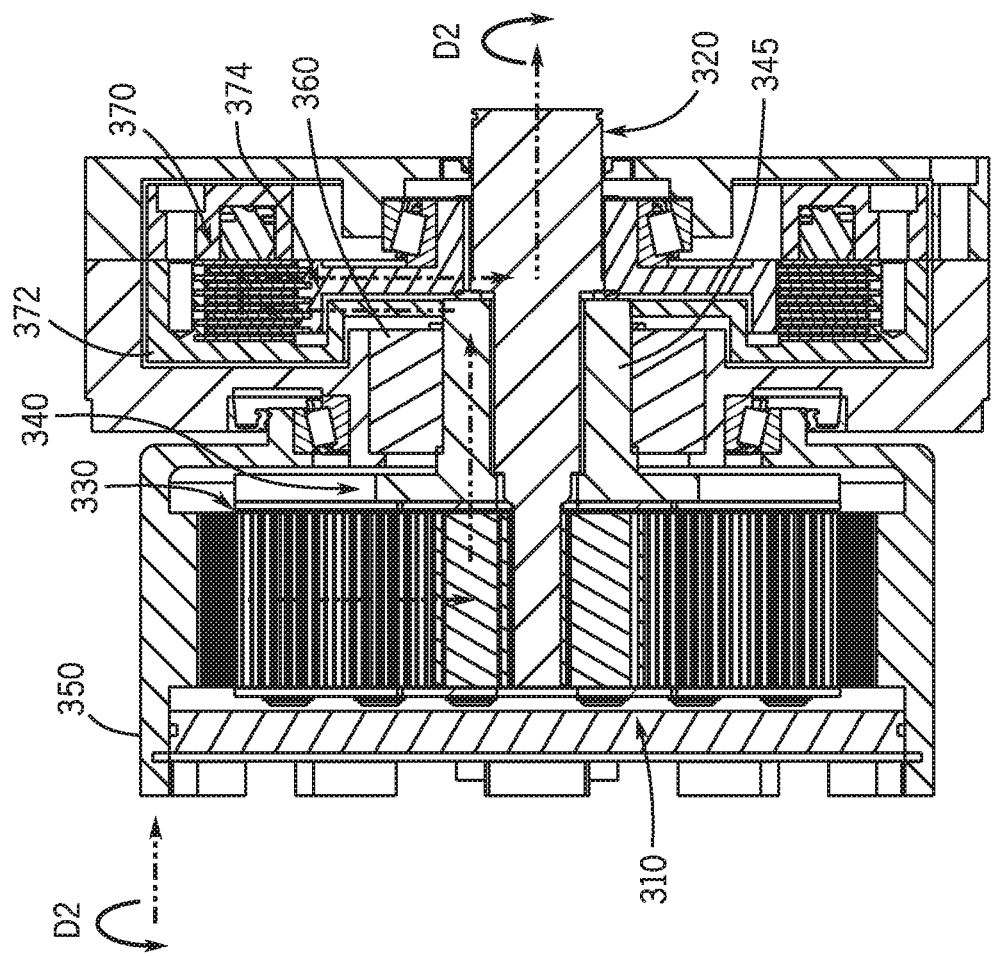
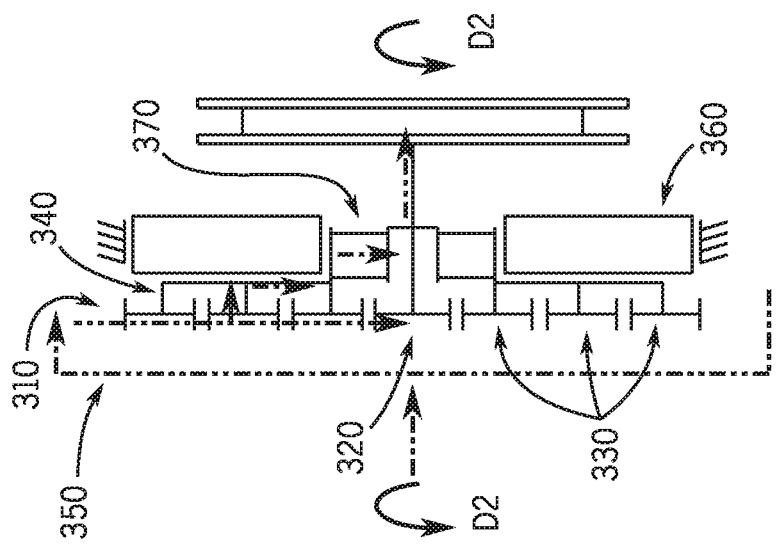

BI-DIRECTIONAL INTEGRATED STARTER-GENERATOR DEVICE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or a generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and devices are typically required, thereby raising issues with respect to size, cost, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine in both cases.

In one aspect the disclosure provides a combination starter-generator device for a work vehicle having an engine includes an electric machine and a bi-directional gear set. The gear set is configured to receive rotational input from the electric machine and from the engine and to couple the electric machine and the engine in a first power flow direction and a second power flow direction. In the first power flow direction the gear set effects a first gear ratio, and in the second power flow direction the gear set effects a second gear ratio. In the first power flow direction, the gear set receives input power from the electric machine in a first clock direction and outputs power to the engine in a second clock direction opposite the first clock direction. In the second power flow direction, input power from the engine is in the second clock direction and output power to the electric machine is in the second clock direction.

In another aspect the disclosure provides a drivetrain assembly including an engine, a belt and pulley arrangement, and a combination starter-generator device including an electric machine and a bi-directional gear set. The gear set is configured to receive rotational input from the electric machine via the belt and pulley arrangement and to receive rotational input from the engine. The gear set couples the electric machine and the engine in a first power flow direction and a second power flow direction in which in the first power flow direction the gear set effects a first gear ratio and in the second power flow direction the gear set effects a second gear ratio. In the first power flow direction, input power is received from the belt and pulley arrangement in a first clock direction and output power to the engine is in a second clock direction opposite the first clock direction. In the second power flow direction, input power from the engine is in the second clock direction and output power to the belt and pulley arrangement is in the second clock direction.

The details of one or more embodiments are set forth in the accompanying drawings and the description below. Other features and advantages will become apparent from the description, the drawings, and the claims.

BRIEF DESCRIPTION OF THE DRAWINGS

FIG. 7A is a sectional view of the power transmission assembly of FIG. 4 depicting a schematic representation of a power transfer path in a generation mode of the example starter-generator device; and FIG. 7B is a partial schematic view of the power transmission assembly of FIG. 7A depicting the power transfer path in the generation mode of the example starter-generator device.

DETAILED DESCRIPTION

Figure 1:
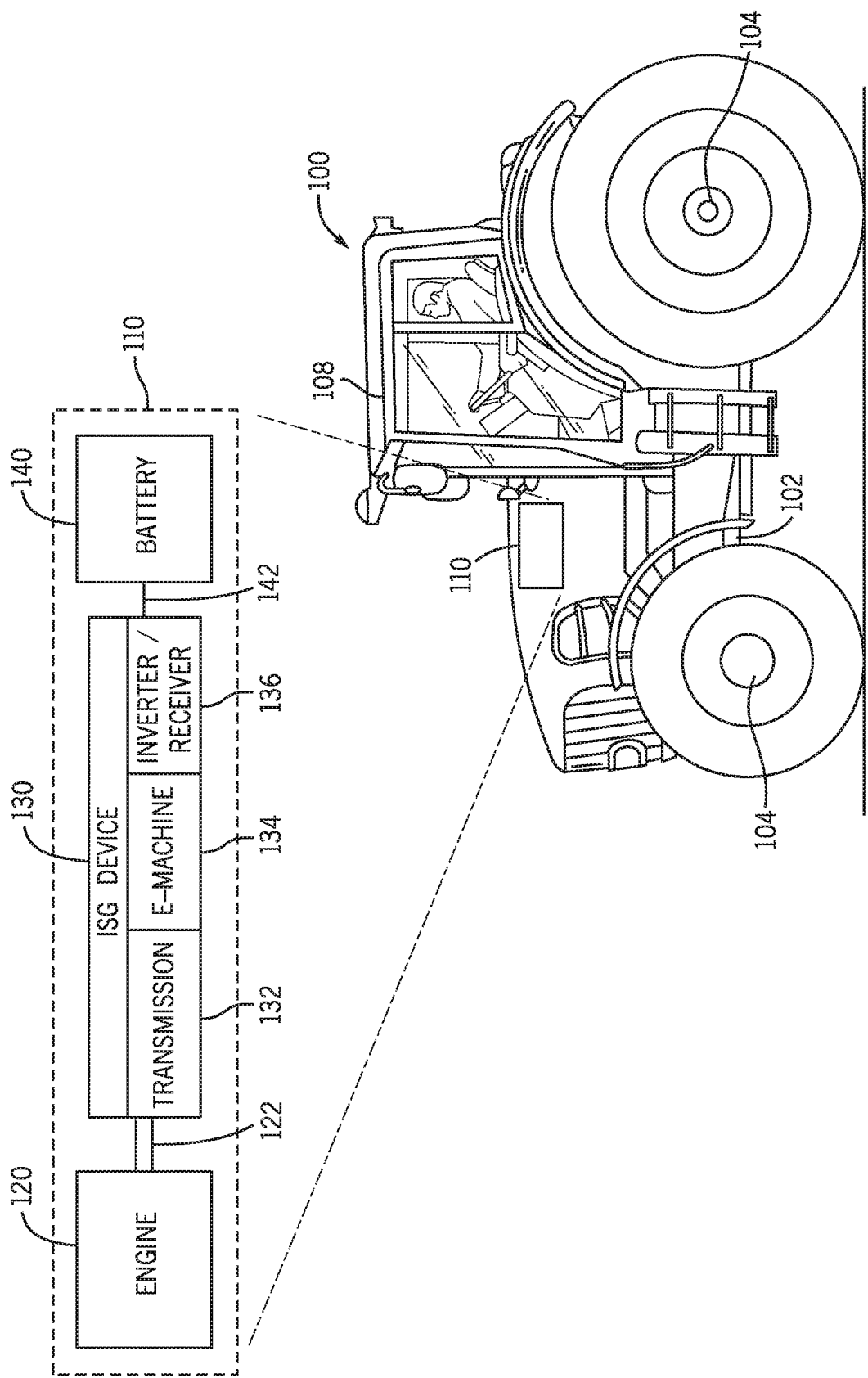
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. Some engines (e.g., diesel engines) initiate combustion by compression of the fuel, while other engines rely on a spark generator (e.g., spark plug), which is powered by the battery. Once the engine is operating, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator ("ISG" or "starter-generator") device. This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include a direct mechanical power coupling to the engine that avoids the use of belts for this purpose. For example, the starter-generator device may include within its housing a power transmission assembly with a gear set that directly couples an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for both the engine start up and electric power generation functions. The direct power coupling between the starter-generator device and engine may increase system reliability, cold starting performance, and electric power generation of the system.

Further, in certain embodiments, the starter-generator device may have a power transmission assembly that automatically and/or selectively shifts gear ratios (i.e., shifts between power flow paths having different gear ratios) according to the direction in which torque is applied to or from the gear set. By way of example, the transmission assembly may include one or more passive engagement components that engage automatically when driven in a particular direction and/or one or more active engagement components that are commanded to engage when driven in a different direction. For example, passive engagement components, such as a one-way clutch (e.g., a roller or sprag clutch), may be used to effect power transmission through a power flow path in the engine start up direction; and an active engagement component, such as a friction clutch, may be used to effect power transmission through another power flow path in the electric power generation direction. In this manner, bi-directional or other clutch (or other) configurations may be employed to carry out the cranking and generating functions with the appropriate control hardware.

As a result of the bi-directional nature of the power transmission assembly, the power transfer belt arrangement includes a belt that is similarly bi-directional. As such, the power transfer belt arrangement may be implemented with a relatively simple arrangement. In particular, the power transfer belt arrangement may only include a single belt tensioner, thereby providing a relatively compact and simple assembly.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system (or plant) 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, and a battery 140. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100. The starter-generator device 130 couples the engine 120 to the battery 140 such that the engine 120 and battery 140 may selectively interact in at least two modes. In a first or engine start mode, the starter-generator device 130 converts electric power from the battery 140 into mechanical power to drive the engine 120, e.g., during engine start up or to provide torque assistance. In a second or generation mode, the starter-generator device 130 converts mechanical power from the engine 120 into electric power to charge the battery 140. Additional details regarding operation of the starter-generator device 130 during the engine start mode and the generation mode are provided below.

In one example, the starter-generator device 130 includes a power transmission assembly 132, an electric machine or motor 134, and an inverter/rectifier device 136. The power transmission assembly 132 enables the starter-generator device 130 to interface with the engine 120, particularly via a crank shaft 122 of the engine 120 (or other power transfer element of the engine 120, such as an auxiliary drive shaft). The power transmission assembly 132 may include gear sets in various configurations to provide suitable power flow and gear reduction, as described below. The power transmission assembly 132 variably interfaces with the electric machine 134 in two different power flow directions such that the electric machine 134 operates as a motor during the engine start mode and as a generator during the generation mode. In one example, discussed below, the power transmission assembly 132 is coupled to the electric machine 134 via a power transfer belt arrangement. This arrangement, along with the multiple gear ratios provided by the power transmission assembly 132, permit the electric machine 134 to operate within optimal speed and torque ranges in both power flow directions. The inverter/rectifier device 136 enables the starter-generator device 130 to interface with the battery 140, such as via direct hardwiring or a vehicle power bus 142. In one example, the inverter/rectifier device 136 inverts DC power from the battery 140 into AC power during the engine start mode and rectifies AC power to DC power in the generation mode. In some embodiments, the inverter/rectifier device 136 may be a separate component instead of being incorporated into the starter-generator device 130 as shown. Although not shown, the power system 110 may also include a suitable voltage regulator, either incorporated into the starter-generator device 130 or as a separate component.

Figure 2:
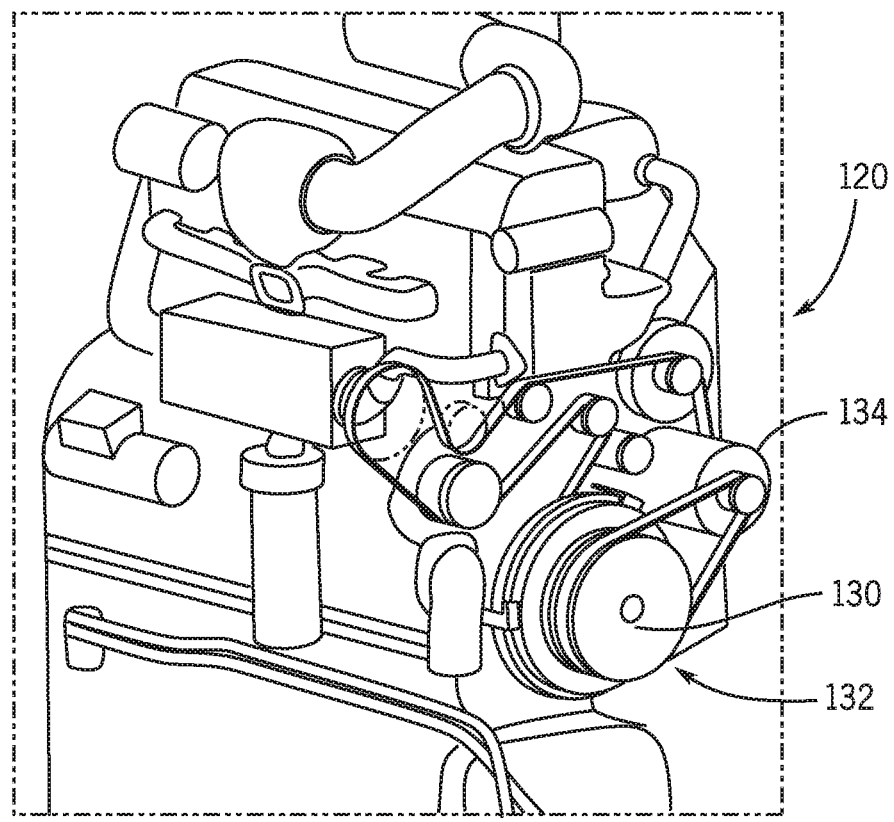
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., the crank shaft 122 as introduced in FIG. 1).

Figure 3:
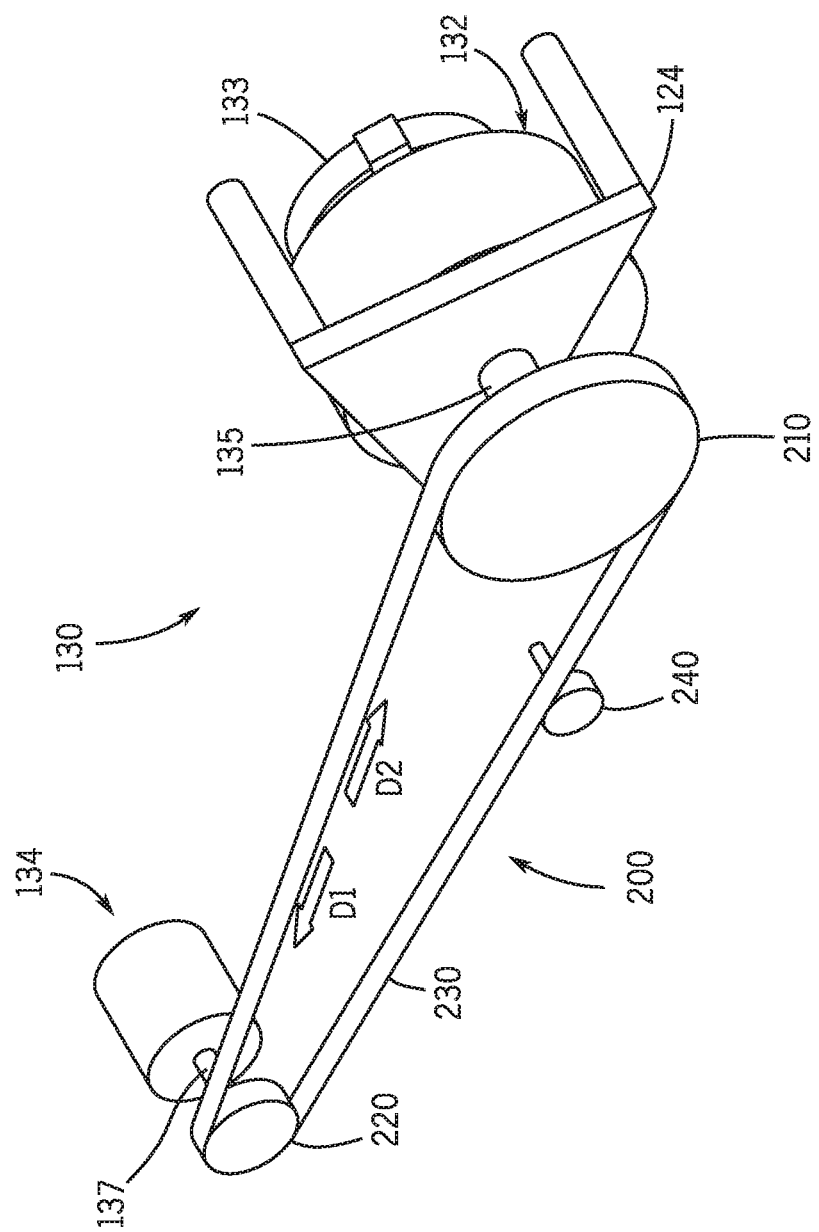
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided.

The power transmission assembly 132 is mounted to the engine 120 and may be supported by a reaction plate 124. As shown, the power transmission assembly 132 includes a first power transfer element 133 that is rotatably coupled to a suitable drive element of the engine 120 (e.g., crank shaft 122 of FIG. 1) and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the engine start mode, the electric machine 134 pulls the belt 230 to rotate pullies 210, 220 in a first clock direction D1 to drive the power transmission assembly 132 (and thus the engine 120); and during the generation mode, the power transmission assembly 132 enables the engine 120 to pull the belt 230 and rotate pullies 210, 220 in a second clock direction D2 to drive the electric machine 134.

As a result of the bi-directional configuration, the power transfer belt arrangement 200 may include only a single belt tensioner 240 to apply tension to a single side of the belt 230 in both directions D1, D2. Using a single belt tensioner 240 to tension the belt 230 is advantageous in that it reduces parts and complexity in comparison to a design that requires multiple belt tensioners. As described below, the bi-directional configuration and associated simplified power transfer belt arrangement 200 are enabled by the bi-directional nature of the gear set in the power transmission assembly 132. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 4:
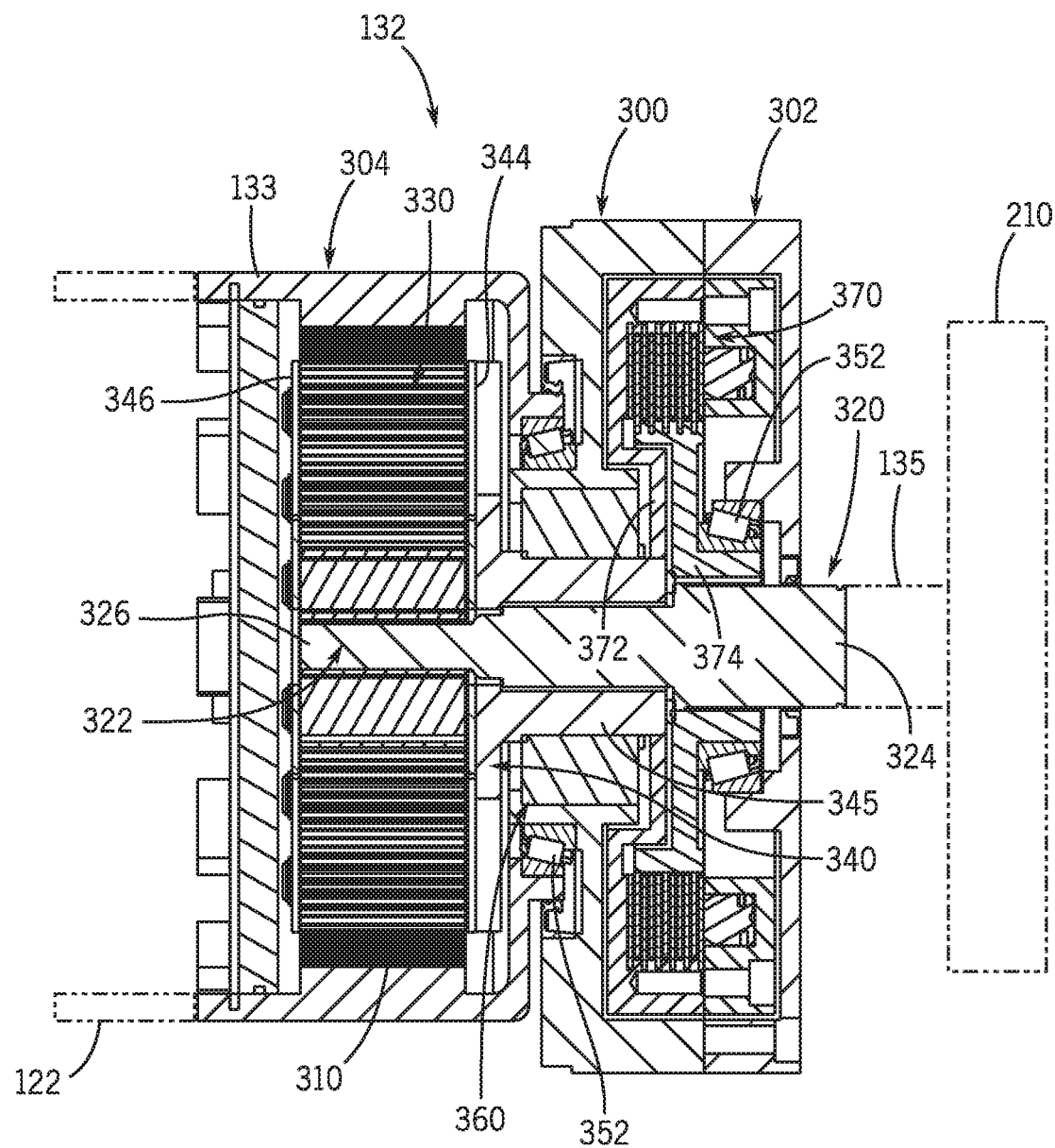
FIG. 4 is a cross-sectional view of a power transmission assembly of the example starter-generator device that may be implemented in the work vehicle of FIG. 1.
Figure 5:
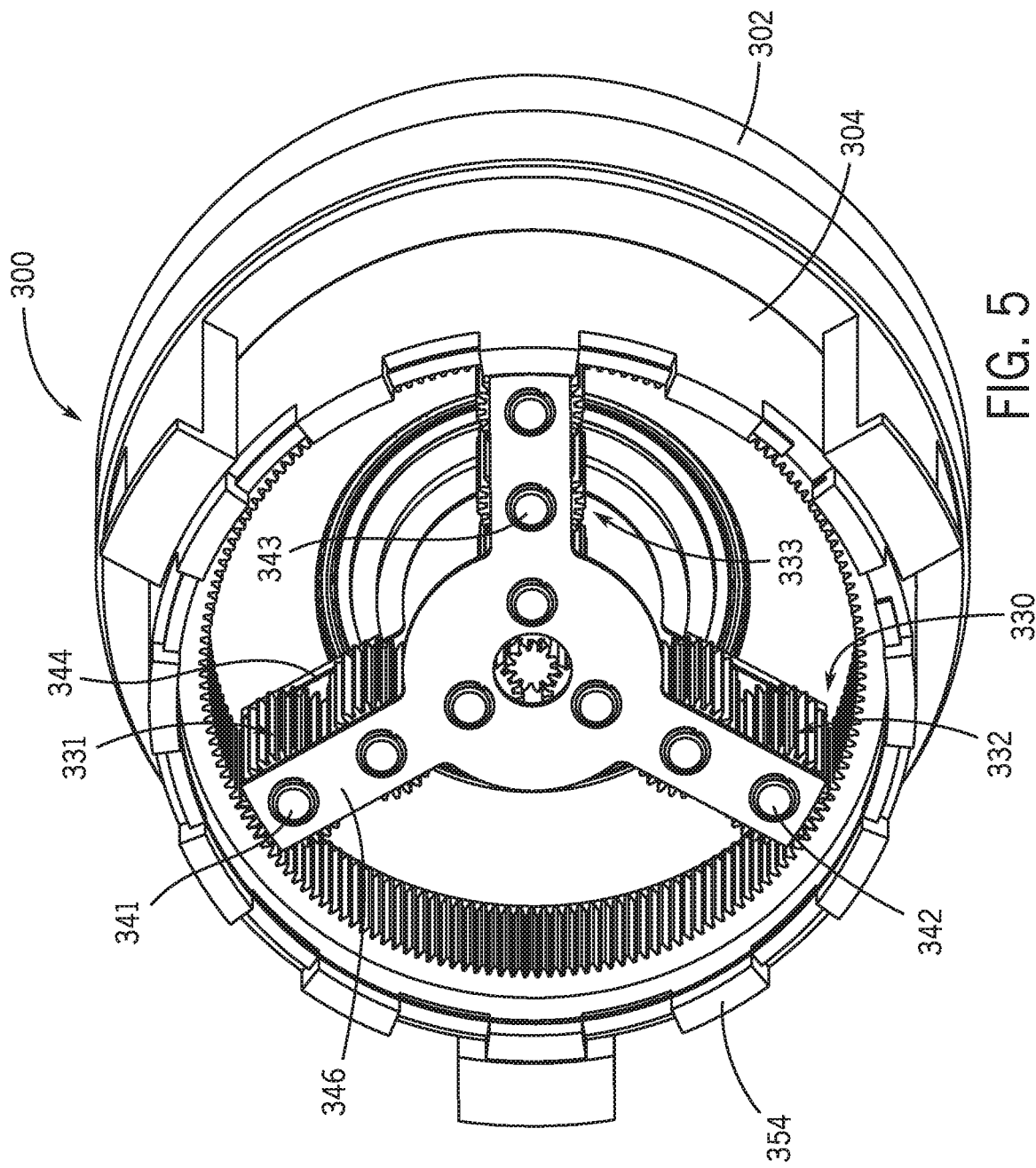
FIG. 5 is a partial isometric end view of the power transmission assembly of FIG. 4 for the example starter-generator device.

In one example, FIGS. 4 and 5 respectively depict a cross-sectional view and isometric end view of the power transmission assembly 132 that may be implemented into the starter-generator device 130. As shown, the power transmission assembly 132 may be considered to be a unit with a common housing 300 formed by a first or stationary housing portion 302 and a second or gear housing portion 304, each housing various aspects of the gear sets and other components of the power transmission assembly 132. The stationary housing portion 302 may be fixedly mounted to the engine 120, as reflected by FIG. 2. In one example, the gear housing portion 304 may be rotatably mounted to the stationary housing portion 302 on bearings 352.

The power transmission assembly 132 includes a planetary gear set 310 primarily housed by the gear housing portion 304. As described below, the gear set 310 functions as the power transfer elements 133, 135 that enable the power transmission assembly 132 to interface with the electric machine 134 (e.g., via the power transfer belt arrangement 200) and the engine 120 (e.g., via direct coupling to the crank shaft 122 of the engine 120). The gear set 310 includes a sun gear 320, a group of planet or pinion gears 330, a planet carrier 340, and a ring gear 350.

The sun gear 320 is formed by a shaft 322 with first and second ends 324, 326. The first end 324 of the sun gear shaft 322 is integral with, or otherwise engages, the power transfer element 135 for interfacing with the electric machine 134. The sun gear shaft 322 extends through the stationary housing portion 302 to appropriately position the second end 326 in the gear housing portion 304. The second end 326 of the sun gear shaft 322 includes a plurality of teeth or splines that mesh with the planet gears 330.

As best shown by FIG. 5, in one example, the gear set 310 includes three groups (e.g., groups 331, 332, 333) of radially stacked planet gears 330 with three individual planet gears in each group 331-333. The planet gears 330 are supported by the planet carrier 340, which circumscribes the shaft 322 of the sun gear 320 and is at least partially formed by first and second radially extending, axially facing carrier plates 344, 346. The carrier plates 344, 346 include radially extending flanges that each provides a row of mounting locations for receiving axles 341, 342, 343 that support the planet gears 330. One of the carrier plates 344 may include or otherwise engage an annular flange 345 that extends axially from the gear housing portion 304 to a position within the stationary housing portion 302. In this arrangement, each of the axles 341-343 respectively forms an individual axis of rotation for each of the planet gears 330, and the planet carrier 340 enables the groups 331-333 of planet gears 330 to collectively rotate about the sun gear 320.

The ring gear 350 circumscribes the sun gear 320 and the planet gears 330. The ring gear 350 includes radially interior teeth that engage the teeth of the radially outermost planet gears 330 of each group 331-333. As such, each group 331-333 of planet gears 330 engages the sun gear 320 and, as a radially stacked row, the ring gear 350.

The ring gear 350 is generally integral with the gear housing portion 304 and as noted above is supported on bearings 352 relative to the stationary housing portion 302. With respect to the planetary gear set 310, the ring gear 350 may function as the power transfer element 133 relative to the engine 120. In particular, the ring gear 350 includes a number of castellations 354 that extend axially about the circumference of the axial face that faces the engine 120. The castellations 354 engage and rotatably fix the ring gear 350 to the crank shaft 122 of the engine 120.

The gear set 310 further includes one or more clutch assemblies 360, 370 that operate as torque application components that selectively engage and disengage to modify the torque transfer within the gear set 310, and thus, between the engine 120 and the electric machine 134. Although example implementations of the clutch assemblies 360, 370 are described below, any of various clutch configurations may be used, including, for example, roller clutches, sprag clutches, wedge clutches, over-running clutches, hydraulic clutches, spring clutches, and mechanical diodes.

The first clutch assembly 360 is an overrun or one-way clutch assembly that is positioned radially in between the annular flange 345 of the planet carrier 340 and the stationary housing portion 302. In one embodiment, the first clutch assembly 360 is a passively controlled clutch that engages to lock or prevent rotation of the planet carrier 340 in a first direction (e.g., the first clock direction D1) and disengages to enable rotation of the planet carrier 340 relative to the stationary housing portion 302 in a second direction (e.g., the second clock direction D2), as discussed in greater detail below.

The second clutch assembly 370 is an active clutch that is positioned in between the sun gear 320 and the planet carrier 340. In particular, the second clutch assembly 370 includes a first clutch element or flange 372 that is fixed to, and extends radially from, the annular flange 345 of the planet carrier 340. The second clutch assembly 370 further includes a second clutch element or flange 374 that is fixed to, and extends radially from, the sun gear 320 at a position proximate to the first end 324 of the sun gear shaft 322. Each of the first and second clutch elements 372, 374 includes one or more radially extending plates that, in this example, are interleaved with one another such that plates of the first clutch element 372 are adjacent to plates of the second clutch element 374. When the second clutch assembly 370 is engaged, the plates of the first and second clutch elements 372, 374 abut and frictionally engage one another to rotationally lock the first and second clutch elements 372, 374 to one another, thereby rotationally locking the planet carrier 340 and the sun gear 320. When the second clutch assembly 370 is disengaged, the plates of the first and second clutch elements 372, 374 are separated by a gap such that the first and second clutch elements 372, 374, and thus the planet carrier 340 and the sun gear 320, are free to rotate independently of one another.

Any suitable mechanism for engaging and disengaging the second clutch assembly 370 may be provided. In one example, the second clutch assembly 370 is actively engaged as a result of hydraulic pressure that urges one of the clutch elements (e.g., the second clutch element 374) toward the other clutch element (e.g., the first clutch element 372). The hydraulic pressure may be applied with a hydraulic circuit (not shown), implemented by any suitable components, including hoses, pumps, conduits, valves, and the like, and based on signals from a controller (not shown). To disengage the second clutch assembly 370, the hydraulic pressure may be released or vented and the first and second clutch elements 372, 374 may be urged apart from one another by a spring, as an example. In other words, the second clutch assembly 370 may be considered an active, hydraulically applied, spring released clutch assembly.

As introduced above, the power transmission assembly 132 may be operated to selectively function in an engine start mode in which the power transmission assembly 132 transfers power from the battery 140 to the engine 120 or in a generation mode in which the power transmission assembly 132 transfers power from the engine 120 to the battery 140. In effect, the power transmission assembly 132 and the power transfer belt arrangement 200 are bi-directional to transfer power in two different power flow directions, depending on the mode. The power flow paths in the different modes are described below with reference to FIGS. 6A, 6B, 7A, and 7B in which arrows are provided to schematically represent the flows of power.

Figure 6A:
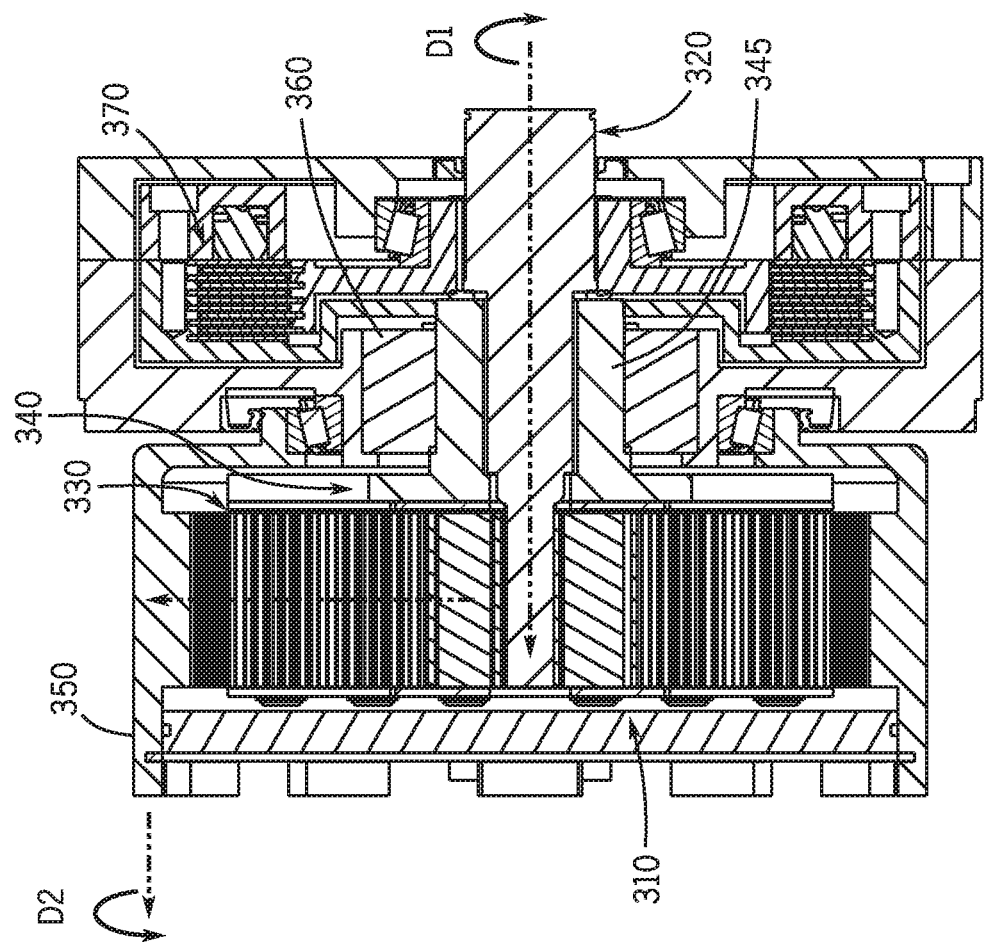
FIG. 6A is a sectional view of the power transmission assembly of FIG. 4 depicting a schematic representation of a power flow path in an engine start mode of the example starter-generator device.
Figure 6B:
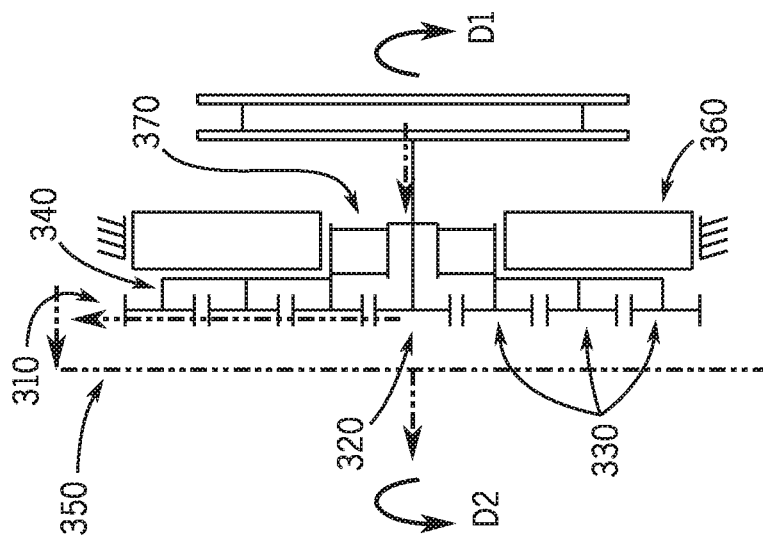
FIG. 6B is a partial schematic view of the power transmission assembly of FIG. 6A depicting the power flow path in the engine start mode of the example starter-generator device.

Reference is initially made to FIG. 6A, which is a cross-sectional view of the power transmission assembly 132 similar to that of FIG. 4 annotated with power flow arrows, and FIG. 6B, which is a simplified schematic version of FIG. 6A. The power flow arrows of FIGS. 6A and 6B particularly depict operation of the power transmission assembly 132 in the engine start mode.

In the engine start mode, the engine 120 is initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the sun gear 320, in the first clock direction D1. The rotation of the sun gear 320 drives rotation of the planet gears 330. Upon movement in the first clock direction D1, the first clutch assembly 360 engages such that the planet carrier 340 is fixed to the stationary housing portion 302 and prevented from rotating. In the engine start mode, the second clutch assembly 370 remains disengaged. Since the position of the planet carrier 340 is locked by the first clutch assembly 360, the rotation of planet gears 330 by the sun gear 320 operates to drive the ring gear 350.

Since the number of planet gears 330 in each group 331-333 is an odd number (e.g., 3) in the radial direction, the planet gears 330 drive the ring gear 350 in the opposite direction (e.g., the second clock direction D2) relative to the sun gear 320 rotating in the first clock direction D1. As noted above, the ring gear 350 functions as the power transfer element 133 to interface with the crank shaft 122 of the engine 120 to drive and facilitate engine start. In effect, during the engine start mode, the power transmission assembly 132 operates as a sun-in, ring-out configuration.

In one example, the power transmission assembly 132 provides a 15:1 gear ratio in the power flow direction of the engine start mode. In other embodiments, other gear ratios (e.g., 10:1-25:1) may be provided. Considering a 4:1 gear ratio from the power transfer belt arrangement 200, a resulting 60:1 gear ratio (e.g., approximately 40:1 to about 80:1) may be achieved for the starter-generator device 130 between the electric machine 134 and the engine 120 during the engine start mode. As such, if for example the electric machine 134 is rotating at 10,000 RPM, the crank shaft 122 of the engine 120 rotates at about 100-150 RPM. Accordingly, the electric machine 134 may thus have normal operating speeds in both power flow directions with relatively high torque output for engine start up (and low torque output during power generation).

Reference is made to FIG. 7A, which is a partial sectional cross-sectional view of the power transmission assembly 132 similar to that of FIG. 4 annotated with power flow arrows, and FIG. 7B, which is a simplified schematic version of FIG. 7A. The power flow arrows of FIGS. 7A and 7B particularly depict operation of the power transmission assembly 132 in the generation mode.

Subsequent to the engine start mode, the engine 120 begins to accelerate above rotational speed provided by power transmission assembly 132, and the electric machine 134 is commanded to decelerate and to cease providing torque to power transmission assembly 132. As a result, the first clutch assembly 360 disengages, and at this point, both the first and second clutch assemblies 360, 370 are disengaged.

After the engine 120 has stabilized to a sufficient speed and the electric machine 134 has sufficiently decelerated or stopped, the second clutch assembly 370 is commanded to engage to operate the power transmission assembly 132 in the generation mode. In the generation mode, the engine 120 rotates the crank shaft 122 and power transfer element 133 that is engaged with the ring gear 350, thus driving the ring gear 350 in the second clock direction D2. The ring gear 350 drives the planet gears 330. Since the first clutch assembly 360 is disengaged and the second clutch assembly 370 is engaged, the planet carrier 340 is free to rotate relative to the stationary housing portion 302 and is locked to the sun gear 320. Therefore, as the ring gear 350 rotates in the second clock direction D2, the planet carrier 340, the planet gears 330, and the sun gear 320 are driven and similarly rotate in the second clock direction D2 at the same rate of rotation as the ring gear 350. As noted above, the sun gear 320 is connected with and provides output power to the electric machine 134 in the second clock direction D2 via the power transfer belt arrangement 200. In effect, during the generation mode, the power transmission assembly 132 operates as a ring-in, sun-out configuration.

In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation (and high torque output for engine start up).

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using a planetary set in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved Also, the following examples are provided, which are numbered for easier reference.

1. A combination starter-generator device for a work vehicle having an engine, the starter-generator device comprising: an electric machine; and a bi-directional gear set configured to receive rotational input from the electric machine and from the engine and to couple the electric machine and the engine in a first power flow direction and a second power flow direction in which in the first power flow direction the gear set effects a first gear ratio and in the second power flow direction the gear set effects a second gear ratio; wherein, in the first power flow direction, the gear set receives input power from the electric machine in a first clock direction and outputs power to the engine in a second clock direction opposite the first clock direction; and wherein, in the second power flow direction, input power from the engine is in the second clock direction and output power to the electric machine is in the second clock direction.

2. The starter-generator device of example 1, further including a belt and pulley coupled to the gear set and the electric machine; wherein input power in the first power flow direction is conveyed from the electric machine to the gear set by the belt and pulley.

3. The starter-generator device of example 2, wherein in the first power flow direction the belt and pulley rotate in the first clock direction and in the second power flow direction the belt and pulley rotate in the second clock direction.

4. The starter-generator device of example 3, further including a single belt tensioner applying tension to a first side of the belt in both the first power flow direction and the second power flow direction.

5. The starter-generator device of example 1, further including at least one clutch assembly coupled to the gear set and configured to engage in the first power flow direction and to disengage in the second power flow direction.

6. The starter-generator device of example 5, wherein the at least one clutch assembly includes a first clutch assembly that is engaged in the first power flow direction and disengaged in the second power flow direction, and a second clutch assembly that is engaged in the second power flow direction and disengaged in the first power flow direction.

7. The starter-generator device of example 6, wherein the first clutch assembly is a one-way mechanically-actuated clutch.

8. The starter-generator device of example 6, wherein the second clutch assembly is a hydraulically actuated or released clutch.

9. The starter-generator device of example 1, wherein the gear set includes an epicyclic gear train including a sun gear, planet gears, a carrier and a ring gear.

10. The starter-generator device of example 9, wherein the planet gears are in a radially stacked multi-planet array in which sets of an odd number of the planet gears are aligned along a radial reference axis.

11. The starter-generator device of example 10, wherein rotational power from the electric machine moves in the first power flow direction from the sun gear to the ring gear to the engine; and wherein rotational power from the engine moves in the second power flow direction from the ring gear to the sun gear to the electric machine.

12. The starter-generator device of example 11, further including first and second clutch assemblies coupled to the gear set and disposed between the engine and the planetary gear set; wherein the first clutch assembly is engaged in the first power flow direction to couple the carrier to a housing of the gear set, and wherein the second clutch assembly is engaged in the second power flow direction to couple the carrier to the sun gear.

13. The starter-generator device of example 12, wherein the first clutch assembly is a one-way mechanically-actuated clutch.

14. A drivetrain assembly for a work vehicle, comprising: an engine; a belt and pulley arrangement; and a combination starter-generator device including: an electric machine; and a bi-directional gear set configured to receive rotational input from the electric machine via the belt and pulley arrangement and to receive rotational input from the engine, the gear set coupling the electric machine and the engine in a first power flow direction and a second power flow direction in which in the first power flow direction the gear set effects a first gear ratio and in the second power flow direction the gear set effects a second gear ratio; wherein, in the first power flow direction, input power is received from the belt and pulley arrangement in a first clock direction and output power to the engine is in a second clock direction opposite the first clock direction; and wherein, in the second power flow direction, input power from the engine is in the second clock direction and output power to the belt and pulley arrangement is in the second clock direction.

15. The drivetrain of example 14, further including a single belt tensioner applying tension to a first side of the belt in both the first power direction and the second power flow direction.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine, the starter-generator device comprising:
    an electric machine;
    a bi-directional gear set configured to receive rotational input from the electric machine and from the engine and to couple the electric machine and the engine in a first power flow direction and a second power flow direction in which in the first power flow direction the gear set effects a first gear ratio and in the second power flow direction the gear set effects a second gear ratio;
    wherein the gear set is a planetary gear set having a sun gear and a carrier;
    at least one clutch assembly coupled to the gear set and configured to engage in the first power flow direction and to disengage in the second power flow direction; and wherein the at least one clutch assembly includes a first clutch assembly that is engaged in the first power flow direction and disengaged in the second power flow direction, and a second clutch assembly that is engaged in the second power flow direction and disengaged in the first power flow direction; and wherein the first clutch assembly is engaged in the first power flow direction to couple the carrier to a housing of the gear set, and wherein the second clutch assembly is engaged in the second power flow direction to couple the carrier to the sun gear.
    wherein, in the first power flow direction, the gear set receives input power from the electric machine in a first clock direction and outputs power to the engine in a second clock direction opposite the first clock direction; and
    wherein, in the second power flow direction, input power from the engine is in the second clock direction and output power from the gear set to the electric machine is in the second clock direction.

2. The starter-generator device of claim 1, wherein the first clutch assembly is a one-way mechanically-actuated clutch.

3. The starter-generator device of claim 1, wherein the second clutch assembly is a hydraulically actuated or released clutch.

4. A combination starter-generator device for a work vehicle having an engine, the starter-generator device comprising:
    an electric machine; and
    a bi-directional gear set configured to receive rotational input from the electric machine and from the engine and to couple the electric machine and the engine in a first power flow direction and a second power flow direction in which in the first power flow direction the gear set effects a first gear ratio and in the second power flow direction the gear set effects a second gear ratio, wherein the gear set includes an epicyclic gear train including a sun gear, planet gears, a carrier and a ring gear and wherein the planet gears are in a radially stacked multi-planet array in which sets of an odd number of the planet gears are aligned along a radial reference axis;
    wherein, in the first power flow direction, the gear set receives input power from the electric machine in a first clock direction and outputs power to the engine in a second clock direction opposite the first clock direction; and
    wherein, in the second power flow direction, input power from the engine is in the second clock direction and output power to the electric machine is in the second clock direction.

5. The starter-generator device of claim 4, wherein rotational power from the electric machine moves in the first power flow direction from the sun gear to the ring gear to the engine; and
    wherein rotational power from the engine moves in the second power flow direction from the ring gear to the sun gear to the electric machine.

6. The starter-generator device of claim 5, further including first and second clutch assembly coupled to the gear set and disposed between the engine and the planetary gear set;
    wherein the first clutch assembly is engaged in the first power flow direction to couple the carrier to a housing of the gear set, and wherein the second clutch assembly is engaged in the second power flow direction to couple the carrier to the sun gear.

7. The starter-generator device of claim 5, wherein the first clutch assembly is a one-way mechanically-actuated clutch.

8. A drivetrain assembly for a work vehicle, comprising:
    an engine;
    a belt and pulley arrangement; and
    a combination starter-generator device including:
    an electric machine;
    a bi-directional gear set configured to receive rotational input from the electric machine via the belt and pulley arrangement and to receive rotational input from the engine, the gear set coupling the electric machine and the engine in a first power flow direction and a second power flow direction in which in the first power flow direction the gear set effects a first gear ratio and in the second power flow direction the gear set effects a second gear ratio; and
    at least one clutch assembly including a first clutch assembly that is engaged in the first power flow direction and disengaged in the second power flow direction, and a second clutch assembly that is engaged in the second power flow direction and disengaged in the first power flow direction, wherein the first clutch assembly is a one-way mechanically-actuated clutch;
    wherein the first and second clutch assemblies are coupled to the gear set and disposed between the engine and the gear set; wherein the gear set is a planetary gear set having a sun gear and a carrier; wherein the first clutch assembly is engaged in the first power flow direction to couple the carrier to a housing of the gear set, and wherein the second clutch assembly is engaged in the second power flow direction to couple the carrier to the sun gear;
    wherein, in the first power flow direction, input power is received from the belt and pulley arrangement in a first clock direction and output power to the engine is in a second clock direction opposite the first clock direction; and wherein, in the second power flow direction, input power from the engine is in the second clock direction and output power to the belt and pulley arrangement is in the second clock direction.

9. The drivetrain of claim 8, further including a single belt tensioner applying tension to a first side of the belt in both the first power direction and the second power flow direction.

10. The drivetrain of claim 8, wherein the planetary gear set includes planet gears and a ring gear; and
    wherein the planet gears are in a radially stacked multi-planet array in which sets of an odd number of the planet gears are aligned along a radial reference axis.

11. The drivetrain of claim 10, wherein rotational power from the electric machine moves in the first power flow direction from the sun gear to the ring to the engine; and
    wherein rotational power from the engine moves in the second power flow direction from the ring gear to the sun gear to the electric machine.

* * * * *

UNITED STATES PATENT AND TRADEMARK OFFICE
CERTIFICATE OF CORRECTION

PATENT NO. : 10,968,985 B2
APPLICATION NO. : 16/385784
DATED : April 6, 2021
INVENTOR(S) : Fliearman et al.

Page 1 of 1

It is certified that error appears in the above-identified patent and that said Letters Patent is hereby corrected as shown below:

On the Title Page

In Item (56), under "OTHER PUBLICATIONS", Column 2, Line 1, delete "Utiiity" and insert -- Utility --, therefor.

In Item (56), under "OTHER PUBLICATIONS", Column 2, Page 3, Line 55, delete "Atalantic" and insert -- Atlantic --, therefor.

In the Claims

In Column 13, Claim 1, Line 38, delete "gear." and insert -- gear; --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*